April 30, 1957    E. HAGENLOCHER ET AL    2,790,312
FLEXIBLE COUPLINGS
Original Filed March 31, 1952    2 Sheets-Sheet 1
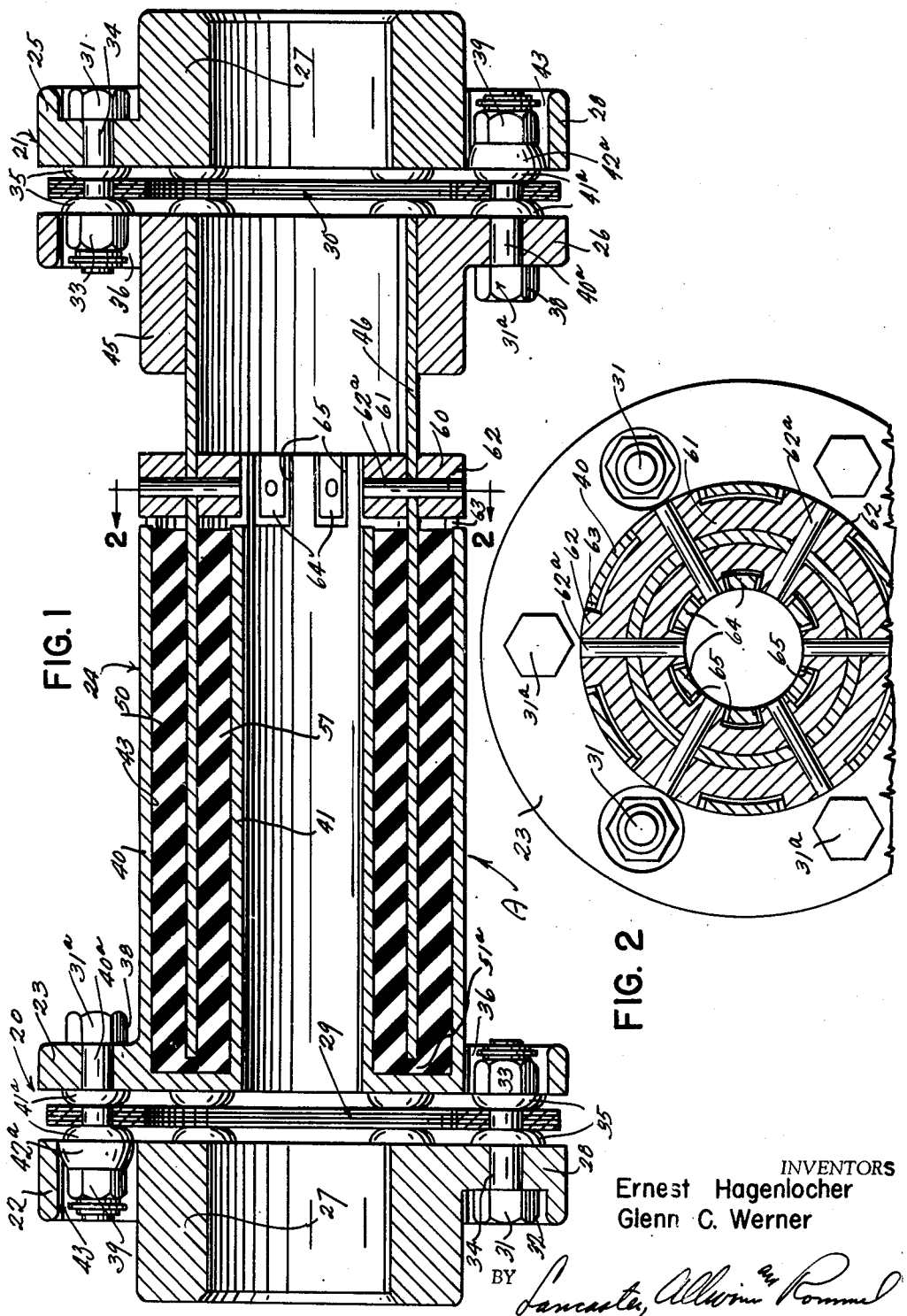
INVENTORS
Ernest Hagenlocher
Glenn C. Werner
BY *Lancaster, Allwine and Rommel*
ATTORNEYS April 30, 1957  E. HAGENLOCHER ET AL  2,790,312
FLEXIBLE COUPLINGS
Original Filed March 31, 1952  2 Sheets-Sheet 2
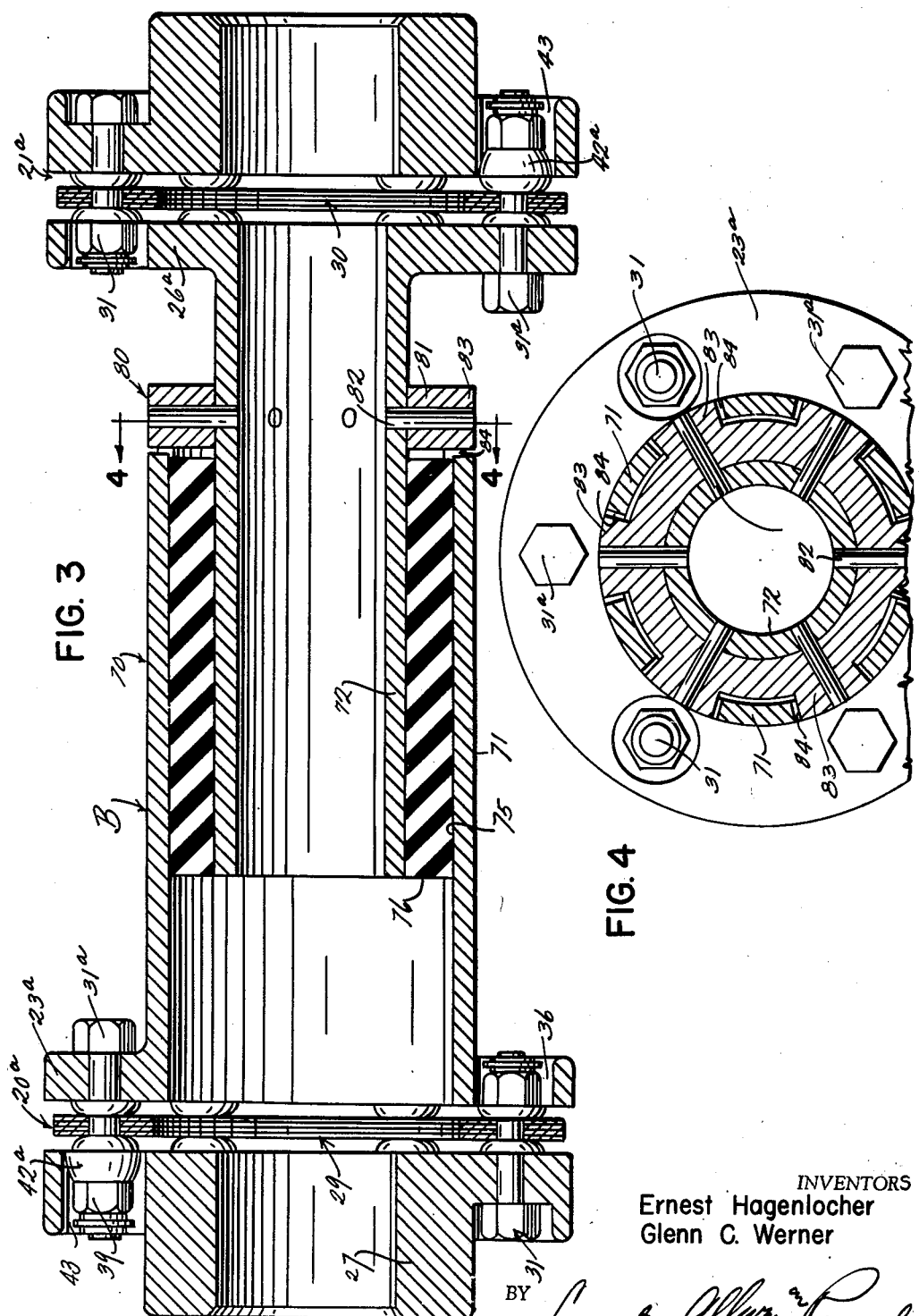
INVENTORS
Ernest Hagenlocher
Glenn C. Werner
BY
ATTORNEYS

United States Patent Office 2,790,312
Patented Apr. 30, 1957

2,790,312
FLEXIBLE COUPLINGS
Ernest Hagenlocher and Glenn C. Werner, Warren, Pa.

Original application March 31, 1952, Serial No. 279,522. Divided and this application March 22, 1955, Serial No. 495,948

5 Claims. (Cl. 64—13)

This invention relates to improvements in flexible couplings with particular reference to a coupling capable of taking care of angular and parallel misalignments, end float, and including a torsionally resilient feature to absorb and dampen vibrations.

The present application is a division out of application Serial No. 279,522, filed March 31, 1952.

The primary object of this invention is the provision of specific types of torsionally resilient coupling wherein rigid shaft attaching flanges are provided with individual sets of transversely flexible metal disc laminations and also other rigid flanges directly connected with said laminations, the last mentioned rigid flanges having directly and rigidly connected therewith rigid tubular portions of different diameters which interfit in radially spaced relation; rubber sleeve means being bonded in the space between and to said tubes for absorbing and damping shaft oscillations.

A further object of this invention is the provision of an improved flexible coupling structure embodying torsionally resilient means such as broadly set forth in U. S. Patent 2,593,877, dated April 22, 1952, and copending application Serial No. 271,008, filed February 11, 1952, now Patent No. 2,745,267, May 15, 1956, but embodying improvements thereover in the provision of elongated tubular means for taking care of torsional deflections.

A further object of this invention is the provision of an improved flexible coupling structure including a plurality of concentric rubber sandwich sleeves bonded to interfitting tubes; the coupling structure including also transversely flexible metal disc laminations to take care of conditions of angular and parallel misalignments and end float of shafts to which the coupling structure may be connected.

Other objects and advantages of this invention will be apparent during the course of the following detailed description.

In the accompanying drawings, forming a part of this specification, and wherein similar reference characters designate corresponding parts throughout the several views:

Figure 1 is a longitudinal cross sectional view taken through one form of improved coupling, utilizing two sets of flexible steel discs; this coupling also embodying an interconnected compound torsionally resilient sleeve structure.

Figure 2 is a transverse cross sectional view, taken substantially on the line 2—2 of Figure 1 through the improved coupling, and showing motion limiting means to limit the amount of angular deflection of the rubber sleeves, for protection of the latter against failure.

Figure 3 is a longitudinal cross sectional view taken through a modified form of coupling which has many of the characteristics of the form of coupling shown in Figure 1, but utilizing only one rubber torsional deflection sleeve.

Figure 4 is a transverse cross sectional view, taken substantially on the line 4—4 of Figure 3, through the motion limiting means for the protection of the rubber torsion sleeve.

In the drawings, wherein for the purpose of illustration are shown preferred and modified forms of the invention, the letter A may generally designate one form of coupling as shown in Figures 1 and 2, and B a type of coupling structure shown in Figures 3 and 4.

In form of invention A shown in Figures 1 and 2, stainless steel disc coupling structures 20 and 21 are provided for connection to the drive and driven shafts (not shown) of machinery with which the coupling structure A is adapted to be associated. Fundamentally, these coupling structures 20 and 21 are identical, and they embody the characteristics of the coupling structure set forth in U. S. Patent 2,182,711. To that end the coupling structure 20 includes connecting flanges 22 and 23, the latter being part of the intermediate connecting structure 24 forming the torsional deflection structure of the coupling A. Similarly, the coupling arrangement 21 includes the flanges 25 and 26.

The flanges 22 and 25 each include a hub portion 27 and the so-called flange body 28 which receives bolts for connection of the flexible steel disc sets 29 and 30 of the coupling portions 20 and 21 respectively.

The individual discs of the sets 29 and 30 are preferably of stainless steel, or other fatigue resisting material. Individually and in sets they will readily flex laterally to take care of shaft misalignment and end float, but are sufficiently rigid to take the strains and stresses incident to driving of the shafts. These discs may be dialed, as to graining, in the manner set forth in Patent 2,182,711. They are provided with transverse openings to receive bolt sets 31 for attachment to the flanges 28 and bolt sets 31[a] for attachment to the flanges 23 and 26.

The bolt constructions 31 and 31[a] are arranged in sets. In the example shown, three of the sets 31 directly connect each flange 28 to its disc set; the other three bolt sets 31[a] directly connect each disc set to a flange 23 or 26, as the case may be.

The bolt sets 31 include the head and nut portions 32 and 33; the shanks 34 being passed through rounded washers 35 for the clamping of the disc sets 29 and 30 therebetween. The flanges 23 and 26 are provided with openings 36 for loosely receiving the nuts 33, for endwise compactness of the coupling structure.

The bolt sets 31[a] also include head and nut portions 38 and 39 and a shank 40[a] receiving washers 41[a] for the clamping of the disc set therebetween. In addition the shanks 40[a] are provided with the safety bushings 42[a]. The latter extend loosely into the openings 43 of the coupling flange bodies 28, as a safety feature to prevent dropping of the parts should fracture of the discs result during operation.

Referring to the structure 24 for taking care of torsional stresses on a torsion axis substantially parallel with the axis of rotation of the coupling structure, as an incident of relative turning movement between the coupling parts, whereby to absorb and dampen disturbing oscillations, the same preferably comprises a pair of spaced rigid tubes 40 and 41 coaxially disposed and rigidly connected to the flange 23 and providing an annular space 43 therebetween. These tubes 40 and 41 are of steel or the same material as the flange 23, and integral and preferably coaxial therewith. The other coupling structure 21 is provided with a hub portion 45 having a steel tube 46 connected rigidly therein, as by welding or keying. The tube 46 is of a diameter to fit into the space 43 equidistant between the tubes 40 and 41, as shown in Figure 1. Rubber sandwich sleeves 50 and 51 are bonded in the usual manner to the facing surfaces of the tubes 40, 41 and 46, and they lie in the space 43, at opposite sides of the sleeve 46. It is to be noted that the extreme end of the tube 46 terminates short of the flange 23, and a rubber insulating disc portion or web 51[a] is located at this point, preferably integral with the sleeves 50 and 51, as shown, The rubber sleeves 50 and 51 have sufficient inherent resiliency to take care of torsional shear. The material is the same as is generally used and referred to in the art as "rubber sandwich" material. However, it is to be understood that the term "rubber" as herein used is intended to cover any resilient material capable of satisfying the strains, stresses and conditions imposed thereon; this material being of natural or synthetic rubber or any approved plastic or other material capable of meeting the torsional demands imposed thereon. The shore durometer may vary according to the torsional loads intended to be carried by the coupling structure. The sleeves 50 and 51 may be vulcanized or otherwise bonded to the annular facing surfaces of the steel tubes 40, 41 and 46 in any approved manner, such as has been outlined in U. S. Patent 2,593,877, dated March 22, 1952.

Circular motion limiting means is preferably provided to protect the rubber sleeves 50 and 51 against too severe torsional stresses, and to prevent failure thereof. Such motion limiting means may take variety of forms, and that generally has been set forth in the co-pending application Serial No. 271,008, filed February 11, 1952, as above mentioned. Such means preferably comprises inner and outer annular rings 60 and 61 riveted or otherwise secured at 62ª upon the tube 46 at the inner and outer surfaces thereof and at the ends of the sleeves or tubes 40 and 41. The rings 60 and 61 are each provided with an outer circumferential series of teeth 62 adapted to interfit in slots or recesses 63 provided at the ends of the tubes 40 and 41; the individual width of the teeth 62 being less than the individual width of the slots or recesses 63, to provide some play of the teeth in said slots in order that the sleeves 50 and 51 can take care of torsional deflection between the coupling parts.

The coupling A is capable of taking care of angular and parallel misalignment of the shaft structures, end float and will also take care of torsional deflection.

Referring to the form of invention B shown in Figures 3 and 4, the flexible disc coupling portions 20ª and 21ª have the same characteristics as the coupling structures 20 and 21 of the form of invention A, and the same reference characters have been applied to these parts. The intermediate structure 70, to take care of torsional stresses, is different from the structure 24 of the form of invention A, and includes a pair of rigid tube or sleeve portions 71 and 72 respectively integrally connected with the flanges 23ª and 26ª of the coupling structures 20ª and 21ª. The sleeve portions 71 and 72 are coaxially arranged and of different diameters so that the sleeve or tube 72 fits within the sleeve 71 to define an annular space 75 between the outer circumference of the sleeve 72 and the inner circumference of the sleeve 71. In the space 75 is disposed a rubber sleeve 76 which has the characteristics of the rubber sleeves above described for the form of invention A; the same being bonded to the tube portions 71 and 72. Motion limiting means 80 is provided for limiting the amount of play between the tubes 71 and 72, to prevent undue stressing of the rubber sandwich sleeve. It may include an annular ring 81 riveted or otherwise secured by pins 82 upon and to the sleeve 72 externally thereof and at the end of the sleeve 71. The ring 81 is provided with a peripheral arrangement of teeth 83 which fit into slots or recesses 84 provided endwise in the sleeve 71. The width of each tooth 83 is less than the width of the complementary slot 84, and of course this determines the amount of angular movement through which the rubber sleeve 76 may stress as an incident of torsional deflection.

Various changes in the shape, size and arrangement of parts may be made to the form of invention herein shown and described without departing from the spirit of the invention or scope of the claims.

We claim:

1. In a flexible coupling construction the combination of a pair of rigid shaft attaching coupling parts, a set of transversely flexible metal laminated discs bolted at spaced zones to each of said coupling parts, a flange for each of the laminated disc sets bolted to the respective flexible disc sets at the opposite side thereof with respect to the coupling part associated therewith and at bolting zones circumferentially spaced from the bolt zones which connect the respective set with its respective coupling part whereby to take care of conditions of misalignment, a rigid elongated metal tube rigidly connected to one of the flanges and extending in horizontal axial alignment with its coupling part, a second elongated rigid metal tube rigidly connected to the other flange and telescoped in circumferentially spaced relation within the first mentioned tube, and an elongated resilient rubber sleeve bonded between and directly to said tubes to take care of torsional vibrations, said tubes throughout that part of their length connected to said sleeve being free of longitudinal splits.

2. A flexible coupling construction as defined in claim 1 in which the second elongated rigid metal tube beyond the end of the first mentioned rigid elongated metal tube is provided with a rigidly attached external annular rigid ring provided with peripheral teeth thereon, the adjacent end of the first mentioned elongated metal tube being slotted for loose engagement of the teeth of said ring in said slots whereby to limit the degree of angular deflection of the rubber sleeve.

3. In a flexible coupling construction the combination of a pair of relatively spaced rigid shaft attaching coupling parts, sets of transversely flexible laminated discs bolted at spaced zones to each of said couplings parts, a flange for each of said laminated sets bolted to the respective sets at the opposite sides with respect to the coupling parts and at zones circumferentially spaced from the bolting zones of the respective sets to the coupling parts, a pair of elongated concentric rigid metal tubes rigidly connected to one of said flanges radially inward of the bolting zones of said flange and extending axially in parallelism with the axis of the coupling part associated therewith, a single rigid metal tube fixedly connected to the other flange and extending in axial parallelism with respect to the axis of said coupling part, the last mentioned tube extending in telescoped spaced interfitting relation between the first mentioned tubes, and resilient rubber sleeves bonded in spaces between the first mentioned tubes and at each side of the last mentioned tube in bonded connection therewith for the purpose of damping shaft oscillations, said rigid tubes throughout that part of their lengths connected to said rubber sleeves being free of longitudinal splits.

4. A flexible coupling construction as defined in claim 3 in which the single rigid metal tube beyond the end of the pair of elongated rigid metal tubes is provided with inner and outer rigid annular rings secured thereon, the inner ring having inner peripheral teeth and the outer ring having outer peripheral teeth, said pair of elongated concentric rigid metal tubes adjacent to said rings being provided with slots into which the teeth of said rings loosely extend for limiting the circumferential deflection of said rubber sleeves.

5. A flexible coupling construction as defined in claim 3 in which the single rigid metal tube terminates at its end adjacent to that flange to which the pair of sleeves are rigidly connected in spaced relation with said flange, said rubber sandwich sleeves having a web portion located between said flange and the facing end of the single metal sleeve.

References Cited in the file of this patent

UNITED STATES PATENTS 2,593,877   Hagenlocher _____ Apr. 22, 1952

FOREIGN PATENTS 579,226   Great Britain _____ July 26, 1946